United States Patent
Yang

(10) Patent No.: US 10,037,170 B2
(45) Date of Patent: Jul. 31, 2018

(54) MOTHERBOARD AND A METHOD FOR BOOT-UP

(71) Applicant: MITAC COMPUTING TECHNOLOGY CORPORATION, Hsinchu (TW)

(72) Inventor: Shun-Chieh Yang, Hsinchu (TW)

(73) Assignee: Mitac Computing Technology Corporation, Hsinchu (TW)

( * ) Notice: Subject to any disclaimer, the term of this patent is extended or adjusted under 35 U.S.C. 154(b) by 277 days.

(21) Appl. No.: 14/974,283

(22) Filed: Dec. 18, 2015

(65) Prior Publication Data

US 2017/0177380 A1    Jun. 22, 2017

(51) Int. Cl.
 *G06F 3/06* (2006.01)
 *G06F 9/4401* (2018.01)
 *H04L 12/24* (2006.01)

(52) U.S. Cl.
 CPC ............ *G06F 3/067* (2013.01); *G06F 9/4416* (2013.01); *H04L 41/24* (2013.01)

(58) Field of Classification Search
 None
 See application file for complete search history.

(56) References Cited

U.S. PATENT DOCUMENTS

| | | | | |
|---|---|---|---|---|
| 7,904,708 | B2* | 3/2011 | Harmer | G06F 9/44505 709/221 |
| 8,898,349 | B1* | 11/2014 | Mondal | G06F 13/385 710/15 |
| 9,632,806 | B1* | 4/2017 | Righi | G06F 9/44505 |
| 9,846,617 | B2* | 12/2017 | Rahardjo | G06F 11/1417 |
| 2007/0002730 | A1* | 1/2007 | Lu | G06F 11/0793 370/216 |
| 2010/0333081 | A1* | 12/2010 | Etchegoyen | G06F 8/60 717/172 |
| 2016/0328300 | A1* | 11/2016 | Rahardjo | G06F 11/1417 |
| 2017/0090896 | A1* | 3/2017 | Lin | G06F 8/61 |

FOREIGN PATENT DOCUMENTS

TW   200304093 A   9/2003
TW   201239759 A1  10/2012

* cited by examiner

*Primary Examiner* — Thomas J Dailey
(74) *Attorney, Agent, or Firm* — Michael Best & Friedrich LLP

(57) ABSTRACT

A motherboard is to be disposed in a local server, and includes a platform controller hub (PCH) that transmits a command associated with read access to image file data, and a baseboard management controller that includes a memory unit and a processor unit which is electrically connected between the memory unit and the PCH. The memory unit stores an image file data associated with boot-up data of the local server. The processor unit receives the command from the PCH, and interprets the command so as to retrieve the image file data stored in the memory unit. The processor unit performs format conversion upon the image file data so as to generate a packet which conforms to protocols of the PCH, and transmits the packet to the PCH.

20 Claims, 6 Drawing Sheets

MOTHERBOARD AND A METHOD FOR BOOT-UP

FIELD

The disclosure relates to a motherboard and a method for boot-up, more particularly to a motherboard and a method for boot-up which reduce hardware cost of a read-only memory and a switch.

BACKGROUND

Referring to FIG. 1 and FIG. 2, a conventional server system includes a local server 1 for usage by a user, a remote server 2 which is coupled to the local server 1 via a network, and an external device 3 which is communicably coupled to the local server 1. The local server 1 includes at least one motherboard 11. Each motherboard 11 includes a southbridge 111, a baseboard management controller (BMC) 112, a first switch 113, a second switch 114, and a plurality of read-only memories (ROMs) 115 which respectively store image file data 116. The image file data 116 stored in one of the read-only memories 115 is selected for boot-up of the local server 1. The remote server 2 stores image file data 21, which may be downloaded through network transmission and stored in a corresponding one of the read-only memories 115 of the local server 1 to serve as the image file data 116 for setup during the boot-up of the local server 1. The external device 3 is exemplified as a USB flash drive, and stores image file data 31, which may be loaded via Direct Access into a corresponding one of the read-only memories 115 to serve as the image file data 116 for setup during the boot-up of the local server 1. Only two of the read-only memories 115 are illustrated in FIG. 2 for illustrative purpose.

When the local server 1 is booting up, the board management controller 112 issues a first control signal to the first switch 113 for opening a channel between the first switch 113 and the southbridge 111 and a channel between the first switch 113 and the second switch 114. The board management controller 112 further issues a second control signal to the second switch 114 for opening the channel between the second switch 114 and the first switch 113 and a channel between the second switch 114 and a corresponding one of the read-only memories 115. The southbridge 111 thus accesses the image file data 116 stored in the corresponding one of the read-only memories 115 via the first switch 113 and the second switch 114, so as to compete the boot-up.

When an error occurs during the boot-up process of the local server 1, for example, when the image file data 116 is damaged, the local server 1 is capable of reloading the image file data 31 or 21 through the external device 3 or the remote server 2 so as to proceed with the boot-up process.

Currently, there are two different approaches to boot-up data update for the local server 1. In the first approach, the baseboard management controller 112 issues a first control signal to the first switch 113 for opening a channel between the first switch 113 and the baseboard management controller 112 and the channel between the first switch 113 and the second switch 114. The board management controller 112 further issues a second control signal to the second switch 114 for opening the channel between the second switch 114 and the first switch 113, and a channel between the second switch 114 and a corresponding one of the read-only memories 115, such that updated image file data (e.g., the image file data 21 originally stored in the remote server 2) is able to be loaded from the baseboard management controller 112 via the first switch 113 and the second switch 114 into the corresponding one of the read-only memories 115. In this way, during a next boot-up process, the updated image file data 21 will be accessed for subsequent boot-up settings. In the second approach, the baseboard management controller 112 issues a first control signal to the first switch 113 for opening a channel between the first switch 113 and the southbridge 111 and the channel between the first switch 113 and the second switch 114. The board management controller 112 further issues a second control signal to the second switch 114 for opening the channel between the second switch 114 and the first switch 113 and a channel between the second switch 114 and a corresponding one of the read-only memories 115, such that updated image file data (e.g., the image file data 31 originally stored in the external device 3) is able to be loaded from the southbridge 111 via the first switch 113 and the second switch 114 into the corresponding one of the read-only memories 115. In this way, during the next boot-up process, the updated image file data 31 will be accessed for subsequent boot-up process.

Since different boot-up data security designs have been introduced to ensure successful boot-up of the local server 1, multiple read-only memories 115 are often required. Each of the read-only memories 115 stores respective image file data 116, and a channel is established between the second switch 114 and any one of the read-only memories 115 when required. Therefore, the more the read-only memories 115, the more channels to be established between the second switch 114 and the respective read-only memories 115, thereby resulting in a relatively complex overall circuit architecture. Moreover, during the process of accessing the image file data 116, since corresponding channel controls are required for different situations, switching mechanism of the baseboard management controller 112 which controls the switches 113, 114 becomes more complicated, so that a more complex design of the baseboard management controller 112 is inevitable.

Accordingly, the conventional server system, for a purpose of protecting integrity of boot-up data, a plurality of read-only memories are required, and a plurality switches are correspondingly arranged, thereby resulting in complication of related control circuits and incurring higher hardware cost.

SUMMARY

Therefore, an object of the disclosure is to provide a motherboard and a method for boot-up which reduce hardware cost of read-only memories and switches.

According to a first aspect of the disclosure, the motherboard is to be disposed in a local server. The motherboard includes a platform controller hub and a baseboard management controller. The platform controller hub transmits a command associated with read access to image file data. The baseboard management controller includes a memory unit and a processor unit which is electrically connected between the memory unit and the platform controller hub.

The memory unit stores an image file data associated with boot-up data of the local server. The processor unit receives the command from the platform controller hub, and interprets the command so as to retrieve the image file data stored in the memory unit accordingly. The processor unit performs format conversion upon the image file data so as to generate a packet which conforms to protocols of the platform controller hub, and transmits the packet to the platform controller hub.

According to a second aspect of the disclosure, the method for boot-up is to be implemented by a server system. The server system includes a local server which is provided with a motherboard. The mother board includes a platform controller hub and a baseboard management controller. The baseboard management controller includes a memory unit which stores an image file data associated with boot-up data, and a processor unit which is electrically connected between the memory unit and the platform controller hub. The method includes:

transmitting, by the platform controller hub, a command associated with read access to image file data;

interpreting, by the processor unit, the command received from the platform controller hub so as to retrieve the image file data stored in the memory unit accordingly;

performing, by the processor unit, format conversion upon the image file data so as to generate a packet which conforms to protocols of the platform controller hub; and transmitting, by the processor unit, the packet to the platform controller hub.

An effect of this disclosure resides in that, by virtue of the processor unit of the baseboard management controller which interprets the command from the platform controller hub so as to retrieve the image file data stored in the memory unit accordingly, which performs format conversion upon the image file data so as to generate a packet that conforms to protocols of the platform controller hub, and which transmits the packet to the platform controller hub, provision of a plurality of read-only memories is not required, and provision of corresponding switches for controlling channels is also not needed, as with the prior art, so as to reduce hardware cost.

BRIEF DESCRIPTION OF THE DRAWINGS

Other features and advantages of the disclosure will become apparent in the following detailed description of embodiments with reference to the accompanying drawings, of which.

DETAILED DESCRIPTION

Figure 1:
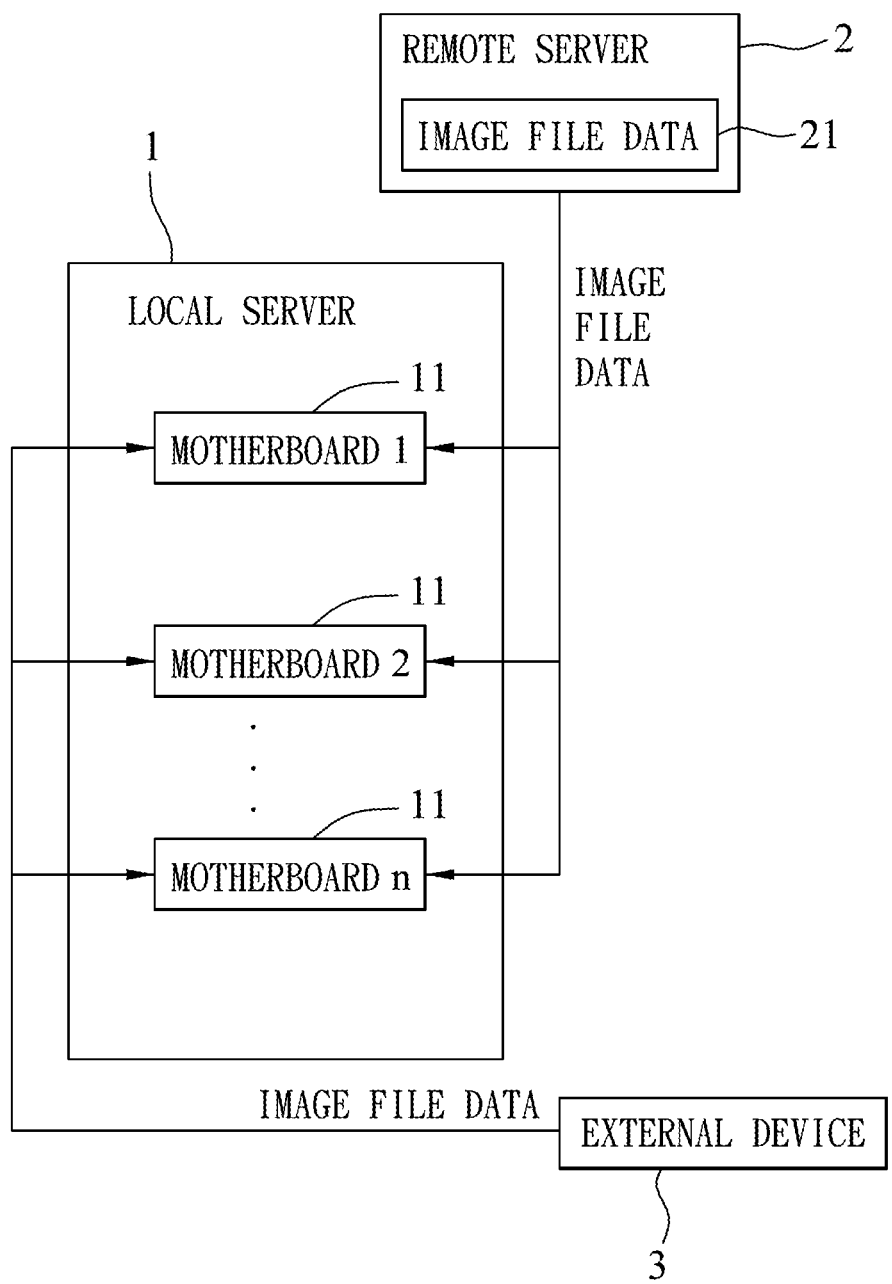
FIG. 1 is a block diagram illustrating a conventional server system.
Figure 2:
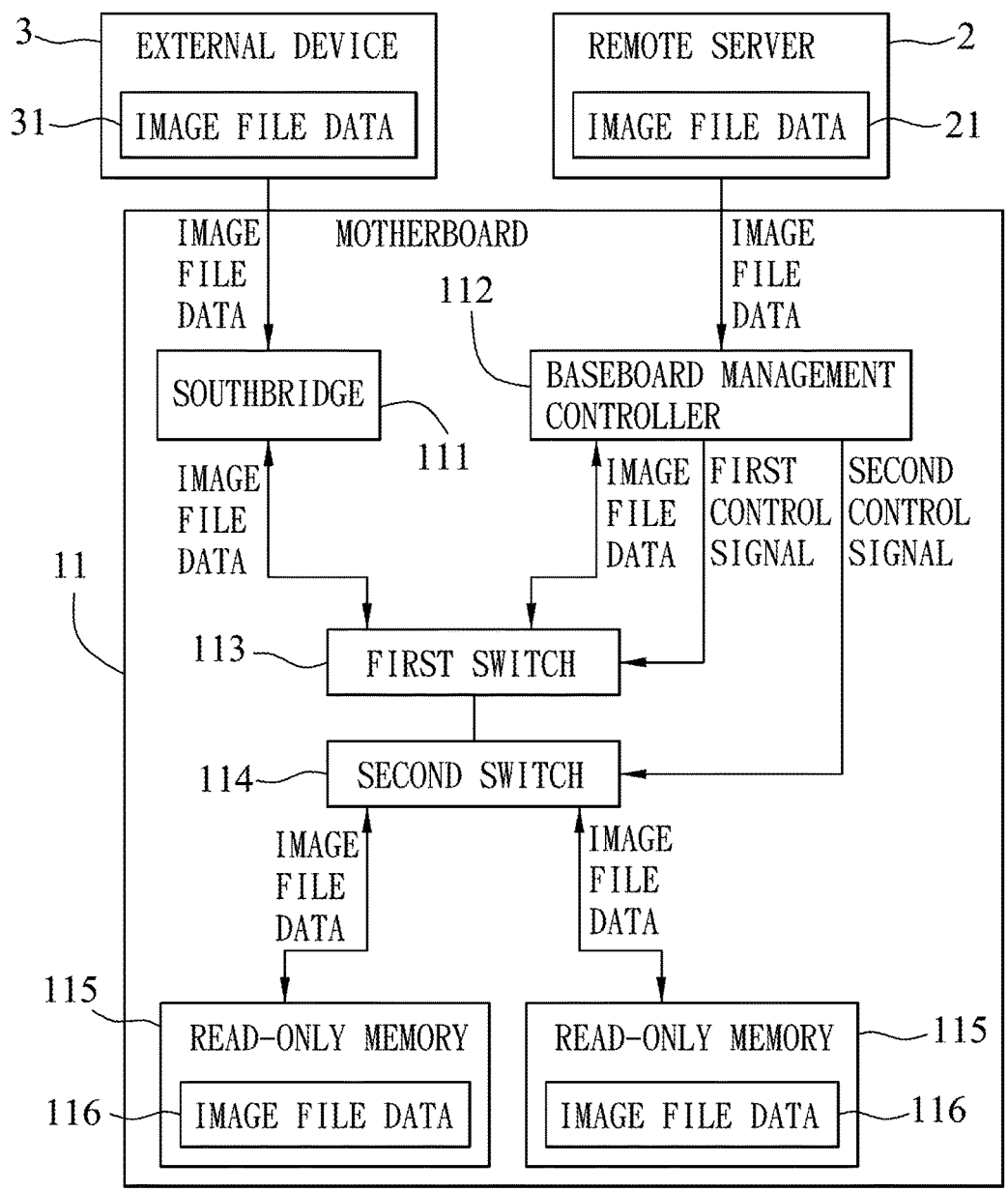
FIG. 2 is a block diagram illustrating a motherboard of the conventional server system of FIG. 1.

Before this disclosure is described in greater detail with reference to the accompanying embodiments, it should be noted herein that like elements are denoted by the same reference numerals throughout the disclosure.

Figure 3:
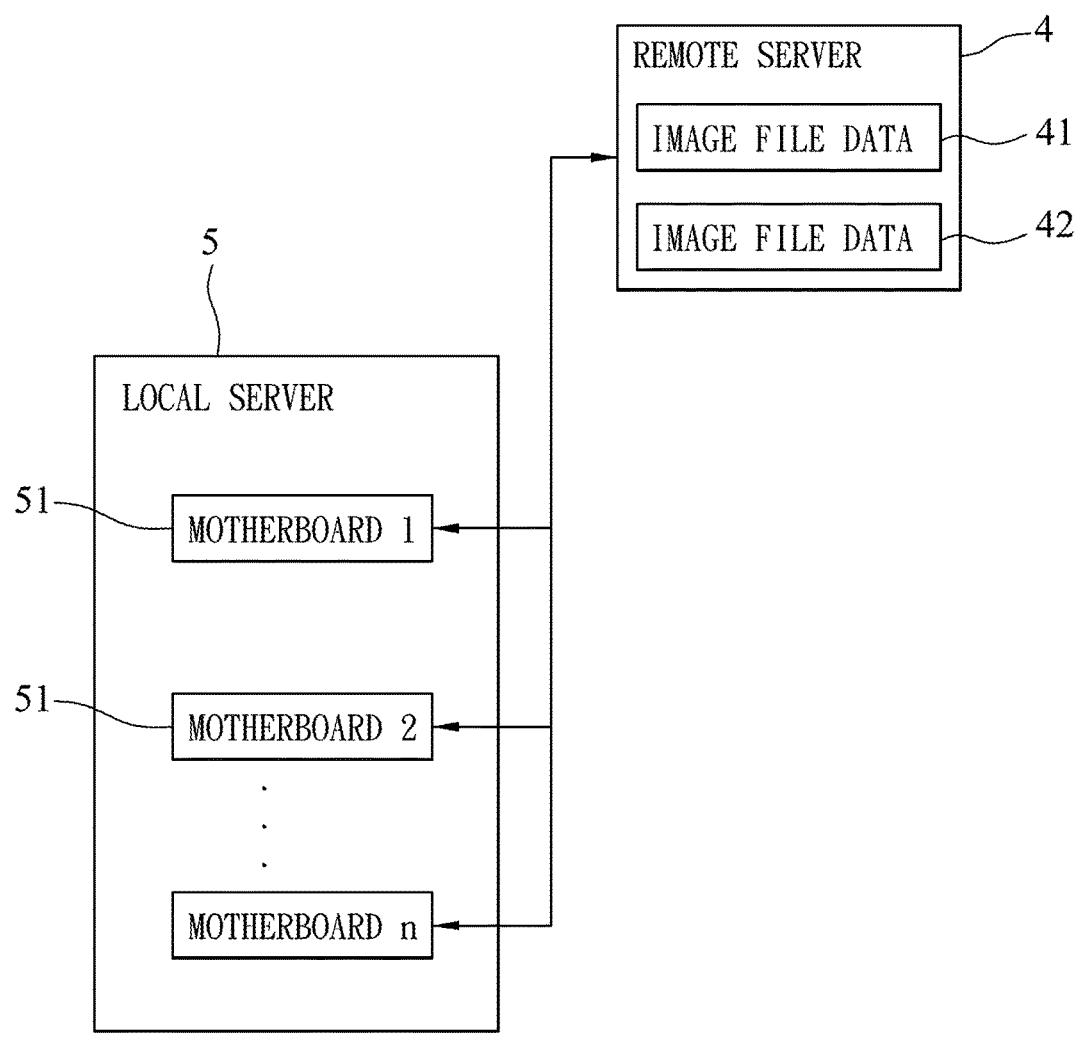
FIG. 3 is a block diagram illustrating an embodiment of a server system according to the disclosure.
Figure 4:
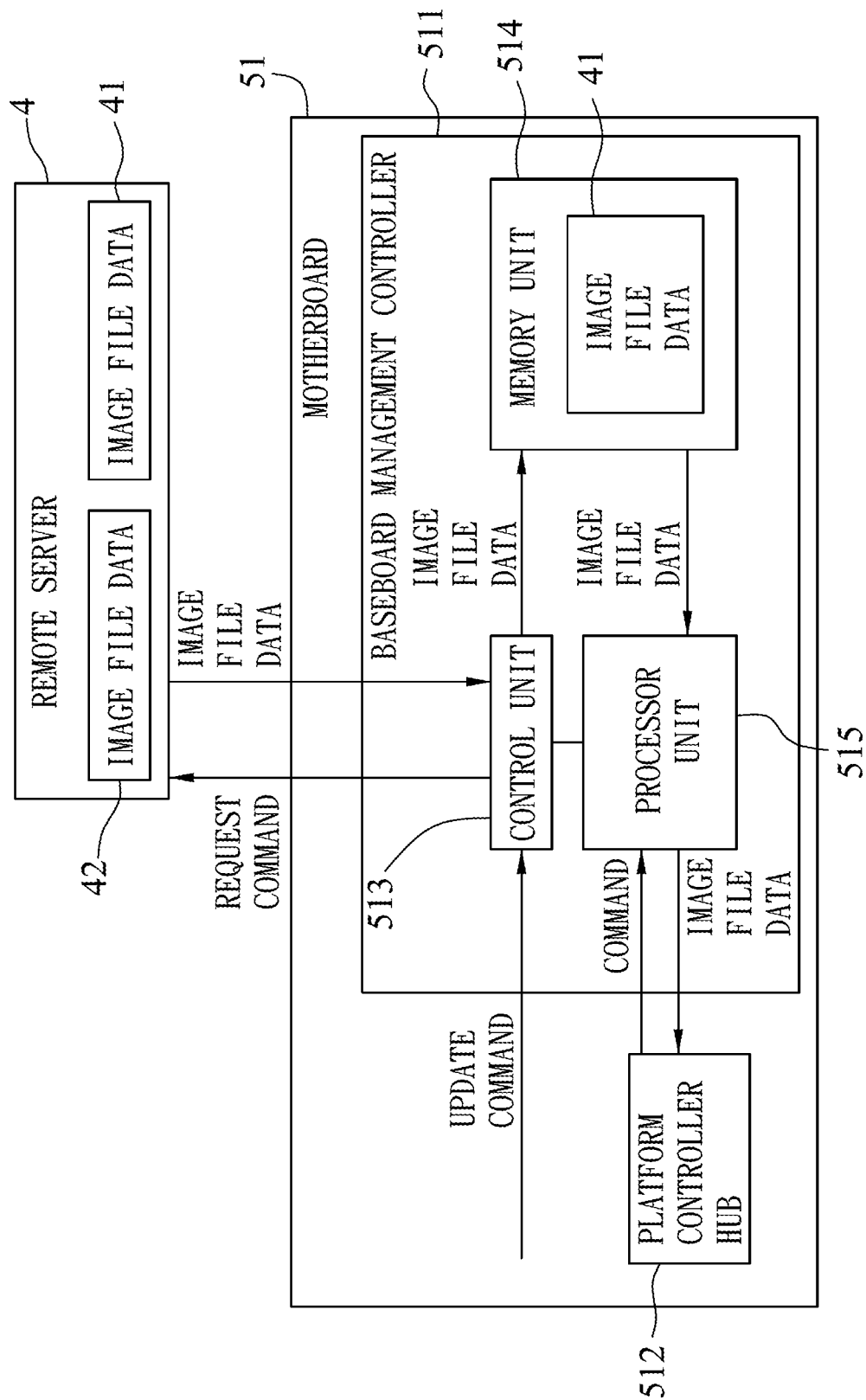
FIG. 4 is a block diagram illustrating an embodiment of a motherboard to be disposed in the server system according to the disclosure.

Referring to FIG. 3 and FIG. 4, an embodiment of a server system according to the disclosure includes a local server 5 and a remote server 4 which stores a plurality of image file data 41 and 42. The local server 5 includes at least one motherboard 51 communicably coupled to the remote server 4. In this embodiment, for the sake of explanation, the local server 5 is assumed to include a single motherboard 51 hereinafter. However, in practice, the number of motherboards 51 is not limited to the disclosure herein. The motherboard 51 includes a baseboard management controller 511 and a platform controller hub 512 (e.g., a southbridge). The baseboard management controller 511 includes a control unit 513 which is communicably coupled to the remote server 4, a memory unit 514, and a processor unit 515 which is electrically connected between the memory unit 514 and the platform controller hub 512. The memory unit 514 is exemplified as a random access memory (RAM) in this embodiment. However, in other embodiments, the memory unit 514 may be exemplified as a read-only memory (ROM) or an electrically erasable programmable read-only memory (EEPROM). When the EEPROM exemplifies the memory unit 514, the EEPROM is usually not provided in the baseboard management controller, and is instead provided on the motherboard and coupled electrically to the baseboard management controller 511.

The memory unit 514 stores image file data 41 associated with boot-up data of the local server 5. In this embodiment, the image file data 41 is a basic input/output system (BIOS) image file. Specifically, the image file data 41 are associated with initialization settings of hardware elements on the motherboard 51, and software environment parameters. The control unit 513 is a serial peripheral interface (SPI) controller of a baseboard management controller (BMC) chip. The processor unit 515 is a central processing unit (CPU).

Figure 5:
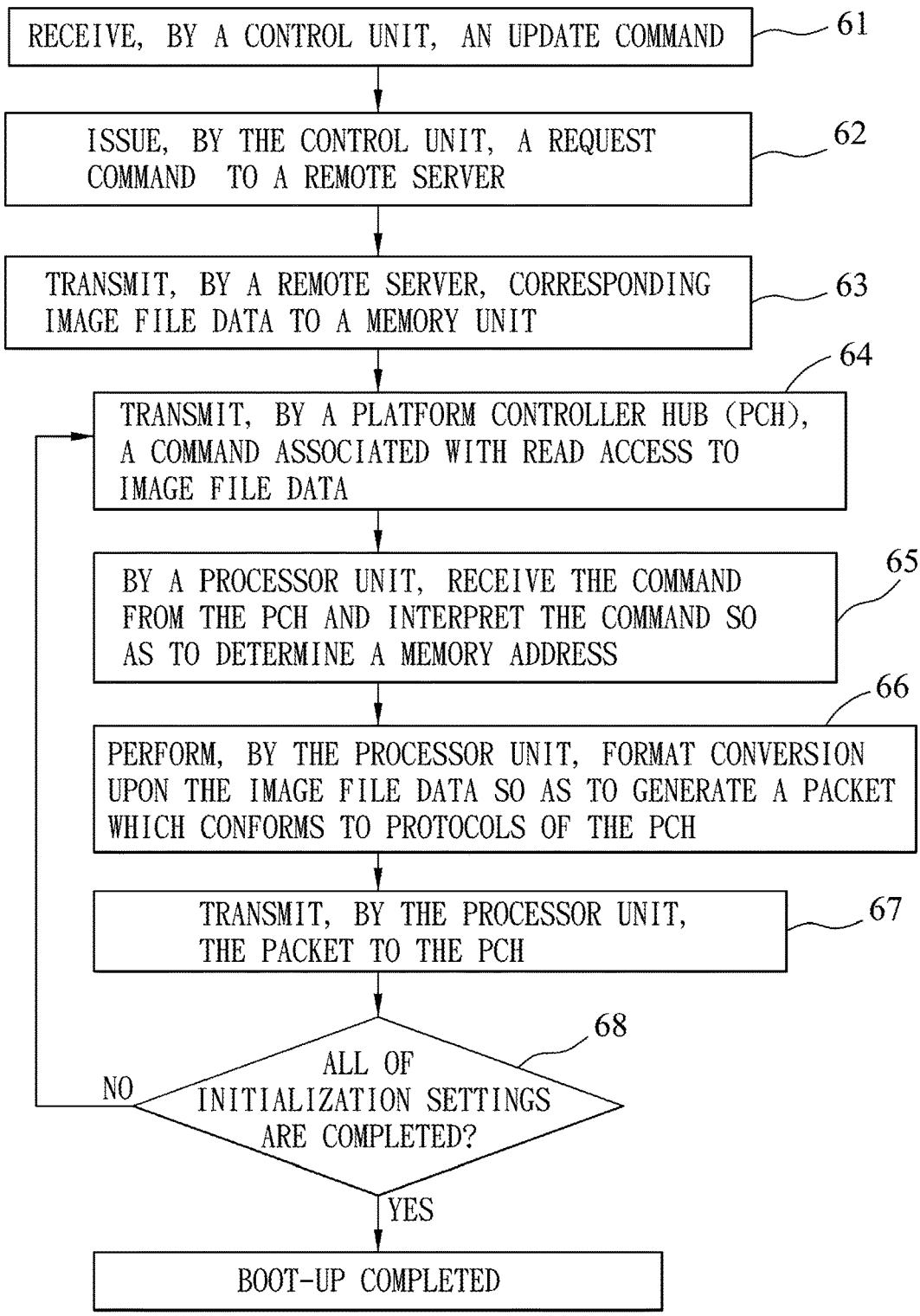
FIG. 5 is flow chart illustrating an embodiment of a method for boot-up according to the disclosure.

Referring to FIG. 5, after the motherboard 51 is powered, elements of the baseboard management controller 511 are initialized. Once the initialization of the baseboard management controller 511 is completed, the server system is programmed to implement an embodiment of a method for boot-up according to the disclosure.

In step 61, the control unit 513 receives an update command. In this embodiment, the update command is an intelligent platform management interface (IPMI) command. Specifically, an input interface of the local server 5 is operated by a system administrator at a server room where the local server 5 is located such that the update command is directly inputted to the control unit 513 of the local server 5. Alternatively, the remote server 4 may be utilized by a server administrator at a remote location to transmit the update command via a network to the control unit 513 of the local server 5. In this way, a task of BIOS update may be performed from one of the local end and the remote end. After initialization of the control unit 513 is completed, the flow proceeds to step 62.

Figure 6:
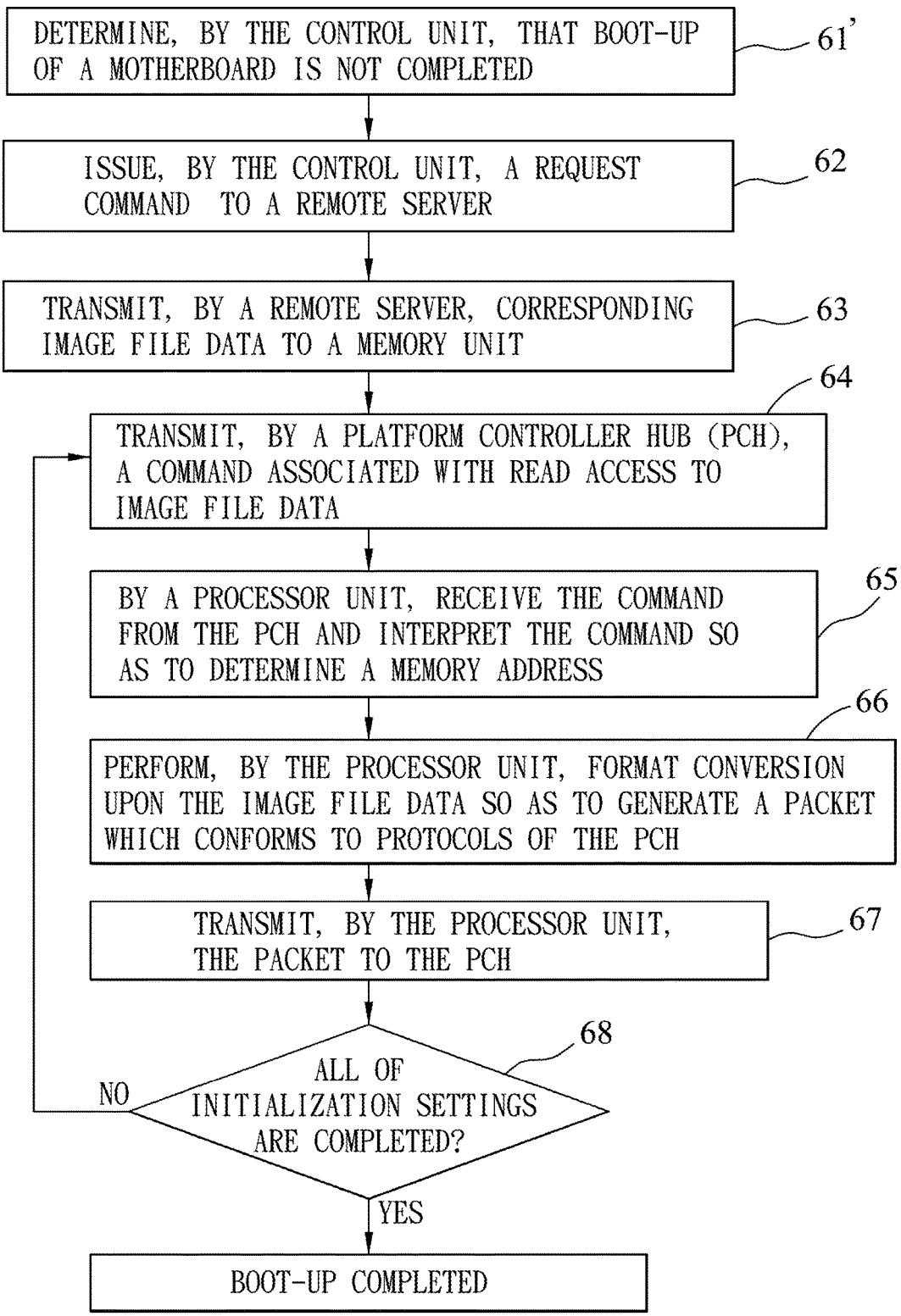
FIG. 6 is flow chart illustrating another embodiment of the method for boot-up according to the disclosure.

In another embodiment of the method for boot-up according to the disclosure, referring to FIG. 6, in step 61', when the control unit 513 determines that boot-up of the motherboard 51 is not completed and image file data are required to be loaded once again, the flow proceeds to step 62. It should be noted that the baseboard management controller 511 is programmed to determine the status of boot-up of the motherboard 51 according to external signals, such as signals from BIOS or the platform controller hub 512. For example, during the boot-up, the power-on self-test (POST) is performed by the BIOS. Generally, once the POST completes successfully, the BIOS will transmit a signal of "POST completed" to the baseboard management controller 511.

In step 62, the control unit 513 issues, a request command which includes an image file characteristic to the remote server 4. Specifically, the image file characteristic includes an image file number specifying one of the image file data. The plurality of image file data 41 and 42 correspond respectively to motherboards with different specifications.

In step 63, the remote server 4 transmits, according to the request command, a corresponding one of the plurality of image file data stored in the remote server 4 to the memory unit 514 of the baseboard management controller 511 via the control unit 3. Specifically, the remote server 4 selects the corresponding image file data (for example, the image file data 41) from the plurality of image file data according to the image file number, and transmits the corresponding image file data to the memory unit 514 so as to complete loading of the image file data and proceed to subsequent boot-up processes. In this embodiment, regardless of whether a size of the image file data is equal to or smaller than a capacity of the memory unit 514, a start address at which the image file data is stored in the memory unit 514 is fixed, and the image file data contains continuous contents. However, allocation of the image file data is not limited to the disclosure herein.

In step 64, the platform controller hub 512 transmits a command associated with read access to image file data. In this embodiment, the command associated with read access to image file data and transmitted by the platform controller hub 512 is a serial peripheral interface (SPI) bus command.

In step 65, the processor unit 515 receives the command from the platform controller hub 512, and interprets the command so as to determine a memory address at which the image file data to be accessed is stored in the memory unit 514 (for example, the image file data 41). The processor unit 515 by virtue of the memory address thus determined is able to retrieve the image file data to be accessed and stored in the memory unit 514 accordingly. It is noted that, the command from the platform controller hub 512 includes a data location parameter associated with the start address at which the image file data is stored in the memory unit 514.

In step 66, the processor unit 515 performs format conversion upon the image file data retrieved in step 65 so as to generate a packet which conforms to protocols of the platform controller hub 512. The protocols of the platform controller hub 512 are related to serial peripheral interface protocols.

In step 67, the processor unit 515 transmits the packet to the platform controller hub 512. After the platform controller hub 512 reads the packet, initialization settings of the local server 5 is performed.

In step 68, the platform controller hub 512 determines whether all of the initialization settings are completed. When it is determined by the platform controller hub 512 that not all of the initialization settings are completed, the flow goes back to step 64; otherwise, boot-up of the local server 5 is completed.

To sum up, an effect of updating and loading image file data without provision of extra read-only memories and corresponding switches may be achieved by virtue of the remote server 4 which loads the corresponding image file data into the memory unit 514 of the baseboard management controller 511, and by virtue of the processor unit 515 of the baseboard management controller 511 which retrieves the image file data stored in the memory unit 514, which performs format conversion upon the image file data so as to generate a packet that conforms to protocols of the platform controller hub 512, and which transmits the packet to the platform controller hub 512. In this way, hardware cost may be reduced.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A motherboard to be disposed in a local server, the motherboard comprising:
a platform controller hub transmitting a command associated with read access to image file data; and
a baseboard management controller including a memory unit and a processor unit which is electrically connected between said memory unit and said platform controller hub;
wherein said memory unit stores an image file data associated with boot-up data of the local server;
wherein said processor unit receives the command from said platform controller hub, and interprets the command so as to retrieve the image file data stored in said memory unit accordingly; and
wherein said processor unit performs format conversion upon the image file data so as to generate a packet which conforms to protocols of said platform controller hub, and transmits the packet to said platform controller hub for boot-up process.

2. The motherboard according to claim 1, wherein said memory unit is a random access memory, and said processor unit interprets the command received from said platform controller hub so as to determine a memory address of the image file data in said random access memory;
wherein the command includes a data location parameter associated with a start address at which the image file data is stored in said random access memory.

3. The motherboard according to claim 2, the motherboard being communicably coupled to a remote server which stores a plurality of image file data,
wherein said baseboard management controller further includes a control unit, said control unit receiving an update command, and issuing, according to the update command, a request command which includes an image file characteristic to the remote server, such that the remote server transmits, according to the request command, a corresponding one of the plurality of image file data stored in the remote server to said random access memory of the baseboard management controller.

4. The motherboard according to claim 3, wherein the image file characteristic includes an image file number, the plurality of image file data corresponding respectively to motherboards with different specifications.

5. The motherboard according to claim 3, wherein the update command is an intelligent platform management interface (IPMI) command.

6. The motherboard according to claim 3, wherein said control unit is a serial peripheral interface (SPI) controller.

7. The motherboard according to claim 2, the motherboard being communicably coupled to a remote server which stores a plurality of image file data, wherein said baseboard management controller further includes a control unit;
after the motherboard is powered, when said control unit determines that boot-up of the motherboard is not completed and image file data are required to be loaded once again, said control unit issues a request command to the remote server, such that the remote server transmits, according to the request command, a corresponding one of the plurality of image file data stored in the remote server to said random access memory of the baseboard management controller.

8. The motherboard according to claim 2, wherein a start address at which the image file data is stored in said random access memory is fixed, and the image file data contains continuous contents.

9. The motherboard according to claim 1, wherein said memory unit is a read-only memory.

10. The motherboard according to claim 1, wherein said memory unit is an electrically erasable programmable read-only memory.

11. The motherboard according to claim 1, wherein the command associated with read access to image file data and transmitted by said platform controller hub is a serial peripheral interface (SPI) bus command.

12. A method for boot-up to be implemented by a server system, the server system including a local server which is provided with a motherboard, the motherboard including a platform controller hub and a baseboard management controller, the baseboard management controller including a memory unit which stores image file data associated with boot-up data, and a processor unit which is electrically connected between the memory unit and the platform controller hub, the method comprising:
  transmitting, by the platform controller hub, a command associated with read access to image file data;
  interpreting, by the processor unit, the command received from the platform controller hub so as to retrieve the image file data stored in the memory unit accordingly;
  performing, by the processor unit, format conversion upon the image file data so as to generate a packet which conforms to protocols of the platform controller hub; and
  transmitting, by the processor unit, the packet to the platform controller hub for boot-up process.

13. The method according to claim 12, the memory unit being a random access memory, the server system further including a remote server which stores a plurality of image file data and which is communicably coupled to the motherboard, the baseboard management controller further including a control unit which is electrically coupled to the remote server, the method, prior to the step of transmitting a command associated with read access to image file data, further comprising:
  issuing, by the control unit, a request command which includes an image file characteristic to the remote server; and
  transmitting, by the remote server according to the request command, a corresponding one of the plurality of image file data stored in the remote server to the random access memory of the motherboard.

14. The method according to claim 13, prior to the step of issuing a request command, further comprising receiving, by the control unit, an update command;
  wherein the step of issuing a request command includes issuing, by the control unit, the request command according to the update command.

15. The method according to claim 14, wherein the update command is an intelligent platform management interface (IPMI) command.

16. The method according to claim 13, wherein the image file characteristic includes an image file number, the plurality of image file data corresponding respectively to motherboards with different specifications.

17. The method according to claim 13, wherein the step of issuing a request command includes:
  issuing, by the control unit, the request command to the remote server when the control unit, after the motherboard is powered, determines that boot-up of the motherboard is not completed.

18. The method according to claim 13, wherein the start address at which the image file data is stored in the random access memory is fixed, and the image file data contains continuous contents.

19. The method according to claim 12, subsequent to the step of transmitting the packet to the platform controller hub, further comprising:
  determining, by the platform controller hub, whether all initialization settings of the local server are completed.

20. The method according to claim 19, wherein the flow proceeds to the step of transmitting a command associated with read access to image file data when it is determined by the platform controller hub that not all the initialization settings are completed.

* * * * *